Figure 3:
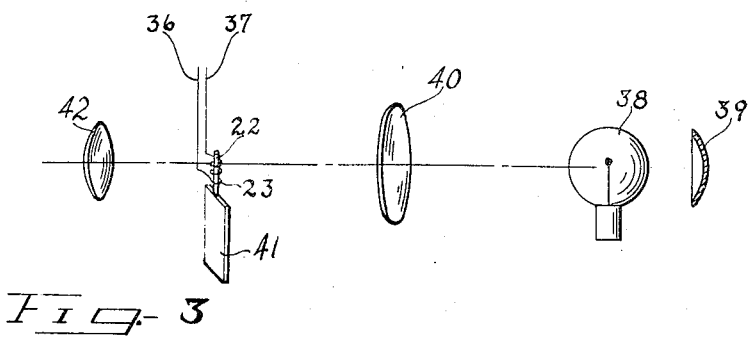

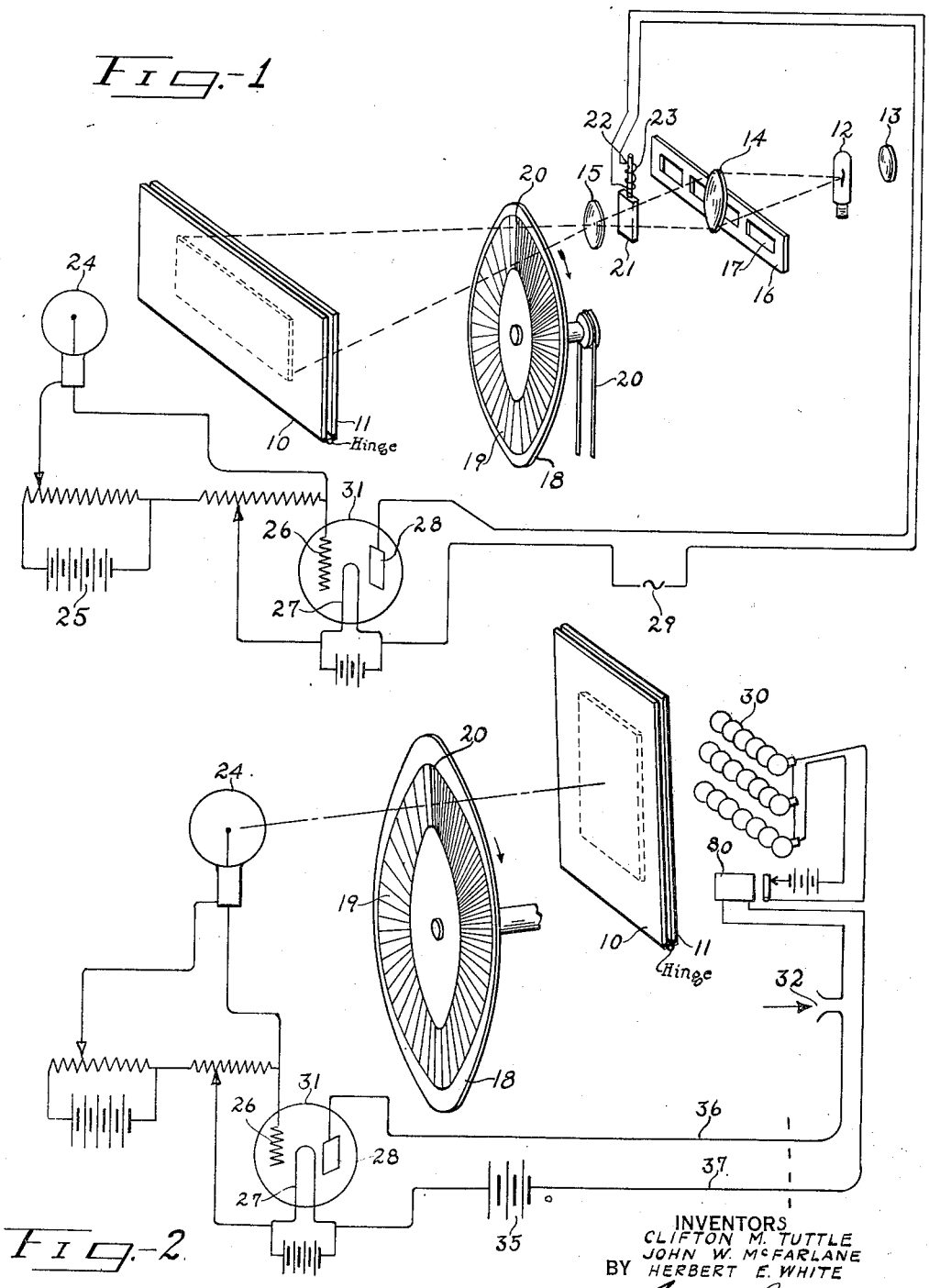

April 10, 1934.   C. M. TUTTLE ET AL   1,954,338
APPARATUS FOR PHOTOGRAPHIC PRINTING
Filed June 19, 1929   2 Sheets-Sheet 2

INVENTORS
CLIFTON M. TUTTLE
JOHN W. McFARLANE
BY HERBERT E. WHITE
ATTORNEY

Patented Apr. 10, 1934

1,954,338

UNITED STATES PATENT OFFICE 1,954,338

APPARATUS FOR PHOTOGRAPHIC PRINTING

Clifton M. Tuttle, Herbert E. White, and John W. McFarlane, Rochester, N. Y., assignors to Eastman Kodak Company, Rochester, N. Y., a corporation of New York Application June 19, 1929, Serial No. 372,083

17 Claims. (Cl. 95—73)

This invention relates to photography and more particularly to a method and apparatus for accurately controlling the printing from negatives.

It has been the usual practice in the making of prints from negatives to rely entirely on the judgment of the operator, that is the operator when making a print of a negative observed the character of the negative and then guessed at the amount of light or time of exposure for the print. This has resulted in a high wastage of time and material and frequently the operator retained prints which did not bring out the best results possible from the negative.

One of the objects therefore of our invention is to provide a device in which either the time or intensity of the exposure of a print or both are manually or automatically controlled so that uniform results are always obtained. It is an additional object of the invention to substitute a measurement of the total light transmission of a negative for the guess of the printing expert in assigning a printing exposure. A further object is to provide means whereby the measurement of the total light transmission controls means to regulate the printing exposure automatically. A still further object is to provide means controlled by the establishing of a visual intensity match with the total transmission of the negative to govern either the intensity or time of the printing exposure.

In one of its phases the invention utilizes the light transmitted by the whole negative or a designated portion thereof to affect a radiation sensitive element which in turn automatically controls the printing exposure. A further phase of the invention utilizes the light transmitted by the negative or by a limited region of the negative to illuminate one portion of a photometric field while the other portion of the field is brought to a visual match by adjusting the intensity of a comparison light source used to illuminate the other portion of the photometric field and causing this adjustment to effect the proper printing control.

Referring to the drawings Figs. 1, 2, 3 and 4 are showings of different forms of an automatic printer represented partially in perspective and partially diagrammatically; the arrangement of Fig. 1 employing the principle of variable intensity and variable time; and the arrangements of Figs. 2 and 3 employing fixed intensity and variable time.

Referring to Fig. 1 there is represented a preferred form of the printing device including two plates 10 and 11 of glass or other transparent material, one of which plates is movable serving as a platen to hold the sensitive material such as sensitized paper for the print and the negative firmly in contact. The device has an optical system including the light source 12 preferably a monoplane lamp and a concave mirror 13 which is positioned to form an image of the filament of the lamp 12 in the plane of the filament itself. A condenser lens 14 images the filament and the filament image at the lens 15 which in turn images lens 14 in the plane of the plates 10 and 11 between which the negative and sensitive material are placed. A mask holder 16, provided with a series of apertures 17 of various sizes, is positioned before the lens 14 and is movable so that any one of the apertures which it contains may be imaged by a lens 15 on the plates 10 and 11. The optical system also includes a disc 18 bearing a circular optical wedge 19 varying in density from its maximum at point 20 to a minimum density also terminating at this line. This disc is actuated by a mechanical connection 20 from a motor (not shown) causing it to make one complete rotation and then to come to a stop. The optical wedge 19 is mounted in the optical path at any position where the cross section of the bundle of rays is small. A filter 21, which transmits photographically non-actinic radiations of such quality that it will affect a radiation sensitive element is also interposed in the optical path at any position between the source of light and the negative. Preferably, it is interposed at a point between the lens 14 and 15. This filter 21 is mounted on the plunger 22 of a solenoid 23, the purpose of which will be later described.

In addition to the optical system just described the printing device is provided with an electrical system including a radiation responsive element 24 positioned in the path of the rays from the source 12 which pass through the optical system and through the negative and the sensitive material. This radiation responsive device, which may be a photoelectric cell or any other device that is responsive to radiations, preferably photographically non-actinic radiations, is energized from a source of electric energy 25 herein represented as a battery. The output of the cell 24 is connected between the grid 26 and the filament 27 of a vacuum tube relay 31 of such characteristics that it has a sharp cutoff point between the maximum and minimum flow of current in its output circuit. The output circuit of this vacuum tube relay connected between the anode 28 and the filament 27 is energized from a source of alternating current 29 and includes the winding of solenoid 23.

In using the device the operator inserts a negative and a piece of sensitive material such as the paper to be printed, between the transparent plates 10 and 11 and then starts the motor which operates by means of the connection 20 to rotate the disc 18 in the direction indicated by the arrow. During this time the non-actinic component of light from the source 12 passes through the filter 21 and through the lens 15 to the photoelectric cell 24. The continued rotation of the disc 18 causes the intensity to decrease to a critical value when the photoelectric cell 24 operates the vacuum tube relay 31 so that current flowing in its output circuit causes the solenoid 23 to withdraw the filter 21 from the optical path. The position at which this change occurs is, of course, determined by the total transmission of the negative. Throughout the remainder of the rotation of the disc 18 the light incident on the negative and sensitive material, is actinic. The remaining time-intensity integral as measured by the remainder of the rotation of the disc 18, is such that the proper exposure is impressed on the sensitive material. While the radiation responsive device 24 has been referred to as a photoelectric cell, other types of physical photometers may be used in the electrical system. It will be understood, of course, that the equipment shown in Fig. 1 should be properly housed within a compartment so that light from foreign sources will not interfere with the operation of the device.

The device of Fig. 1 by a slight rearrangement of parts can be made to start the operation with actinic light and continued to print until the photoelectric cell intensity increases to such a value that the vacuum tube relay 31 is actuated. The changes for this method of operation include rotating the optical wedge 19 counter-clockwise and normally having the filter 21 or its equivalent a shutter out of the optical path. Thus the printing continues until the light through the optical wedge reaches such intensity that the photoelectric cell 29 causes the vacuum tube 31 to operate. This in turn causes the solenoid to move the filter or shutter 21 into the optical path to end the exposure period. Thus the tripping of the relay 31 will be at the highest intensity level to which the cell 24 is subjected, thereby achieving more positive action and also the cell measures actinic radiation so that there will be a tendency to compensate for fluctuation in line voltage.

In the foregoing arrangement the light intensity as well as the time of exposure is variable. In Fig. 2 there is disclosed a modified form of automatic printer in which the intensity on the negative and sensitized material included between the transparent plates 10 and 11 is constant and wherein the time of exposure is varied by the intensity of radiation transmitted through the sensitive material, the negative and the plates 10 and 11, which radiation, after passing through the optical wedge 19, reaches the photoelectric cell or other physical photometer 24. The light source 30 may be a bank of lamps operated with or without the control of an auxiliary relay 80 from the output of the vacuum tube relay 3.

In operating this form of the invention the operator inserts the printing paper and negative between the plates 10 and 11 and starts a single rotation of the disc 18 and at the same time closes the switch 32 in the output circuit of the vacuum tube relay 31. At some point in the rotation of the disc 18 light of proper intensity from the light source 30 passes through the negative and sensitive material, and thence through the optical wedge 19 to the photoelectric cell 24. This sets up a difference of potential across the electrodes of the cell to actuate the vacuum tube relay 31. When this relay operates, it actuates auxiliary relay 80 to extinguish the bank of lamps 30.

The arrangement shown in Fig. 2 may be modified by substituting the arrangement shown in Fig. 3 for the bank of lamps 30 in which case conductors 36 and 37 are connected to correspondingly designated conductors leading to the vacuum tube relay 31 of Fig. 2 at the point indicated by the broken line. In this modification the concave mirror 39 forms an image of the filament of the monoplane lamp 38 in the plane of the filament itself while the condenser lens 40 images the filament and filament image on the lens 42. A shutter 41, mounted on the plunger of the solenoid is placed so that it may be moved into the path of rays from lamp 38. The rays thus pass through the negative and sensitive material placed between the transparent plates 10 and 11 from which they pass through the optical wedge 19 and thence to the photoelectric cell 24. As the optical disc makes its single rotation, a point is reached when the rays actuate the photoelectric cell 24 to cause the operation of the vacuum tube relay 31 which energizes the solenoid 43, moving the shutter 41 into the path of the rays so that the photographically actinic light is cut off and the printing terminated.

The structural details have been omitted from the showing of the various modifications of the invention since it was believed that their inclusion would complicate the disclosure of the invention. It will be understood that these devices are properly housed to exclude foreign light and that various details of adjustment may be provided which will be readily understood by those skilled in this art. When we refer herein to a negative we mean thereby any image bearing record, whether made by photographic or other processes, from which a copy is to be made.

We consider as included within our invention each of the processes and apparatus herein disclosed. We further contemplate as a part of our invention all such modifications and equivalents as fall within the scope of the appended claims.

What we claim is:

1. In a device for printing photographic records, means for supporting in superimposed relation a photographic record and a sensitized layer to be printed, a light source, means for concentrating light from said source on said record and said layer, an adjustable optical density wedge interposed in the path of light between said source and said record, means for moving said wedge through its range of movement, a filter for actinic light in the path of light between said record and said light source, mechanism to withdraw said filter from the path of said light, and a device sensitive to non-actinic light passing through said filter and said wedge from said source, said device being responsive to a predetermined intensity of non-actinic light through said wedge and said record from said source for operating said mechanism to withdraw said filter from said light path.

2. In a device for printing photographic records, means for supporting in superimposed position a photographic record and a sensitized layer to be printed, a light source, means for concentrating light from said source on said record and said layer, an adjustable circular optical wedge interposed in the path of light between said source and said record, means for effecting a single rotation of said wedge, a filter for the actinic light, and a device sensitive to non-actinic light passing through said filter, said record and said wedge from said source, said device being responsive to a predetermined intensity of non-actinic light through said wedge and said record for operating said mechanism to withdraw said filter from said light path.

3. In a device for printing photographic records, means for supporting a photographic record, a light source, means for concentrating light from said source on said record, an adjustable optical density wedge interposed in the path of light between said source and said record, means for moving said wedge through its range of movement, a filter for actinic light in the path of light between said record and said light source, mechanism to withdraw said filter from the path of said light, and a device sensitive to non-actinic light passing through said filter and said wedge from said source, said device being responsive to a predetermined intensity of non-actinic light through said wedge and said record from said source for operating said mechanism to withdraw said filter from said light path.

4. In a device for printing photographic records, means for supporting a photographic record, a light source, means for concentrating light from said source on said record, an adjustable circular optical wedge interposed in the path of light between said source and said record, means for effecting a single rotation of said wedge, a filter for the actinic light, and a device sensitive to non-actinic light passing through said filter, said record and said wedge from said source, said device being responsive to a predetermined intensity of non-actinic light through said wedge and said record for operating said mechanism to withdraw said filter from said light path.

5. The method of printing from a negative which comprises exposing the negative and a sensitized layer to a printing light of constant intensity progressively varying at a known rate the intensity of the light transmitted through the negative and sensitized layer and terminating the exposure when the intensity of the transmitted light as varied reaches a predetermined value.

6. In a device for printing photographic records, means for supporting in superimposed relation a photographic record and a sensitized layer to be printed, a light source, a device responsive to a predetermined intensity of light, an adjustable optical density wedge interposed in the path of light between said source and said device, means for moving said wedge through its range of movement to vary the intensity of the light falling on said device and means controlled by said device for governing the exposure given to said sensitized layer.

7. In photographic printing apparatus, a light source, a device responsive to a predetermined intensity of light, means for supporting in superimposed relation a photographic record and a sensitized layer in the path of light between said source and said device, an adjustable optical density wedge also interposed in said path of light, means for moving said wedge through its range of movement and means controlled by said device for terminating the exposure of said sensitized layer when the intensity of the light transmitted by said wedge reaches a predetermined value.

8. A photographic printer comprising means for supporting a negative and a sensitive sheet, a source of light mounted to cast a printing beam through such negative upon a sensitive sheet supported in the printer and means responsive to rays transmitted through the negative for automatically terminating the casting of light rays upon the sensitive sheet.

9. A photographic printer comprising means for supporting a negative and a sensitive sheet, a source of light mounted to cast a printing beam through such a negative upon a sensitive sheet supported in the printer, means for definitely terminating the exposure of the sensitive sheet to the beam, and means responsive to rays transmitted through the negative and operative automatically to control the total quantity of light passing from the negative to the sensitive sheet and tending to render this quantity uniform, thereby compensating for variations in density in the image bearing sheet.

10. A photographic printer comprising means for supporting a negative and a sensitive sheet, a source of light mounted to cast a beam through a negative upon a sensitive sheet supported in the printer, means for definitely terminating the exposure of the sensitive sheet to the beam, and a radiation sensitive element in the path of rays passing from said source through said negative and controlling the actuation of the means for terminating the exposure of the sensitive sheet.

11. A photographic printer comprising means for supporting a negative and a sensitive sheet, a source of light mounted to cast a beam through a negative upon a sensitive sheet supported in the printer, means for definitely terminating the exposure of the sensitive sheet to the beam, and a radiation sensitive element in the path of rays passing from said source through said negative and controlling the actuation of the means for terminating the exposure of the sensitive sheet, and operative to retard the actuation when the rays reaching the radiation responsive means are weak.

12. Photographic apparatus comprising means for supporting a sensitized layer in position to be exposed to light rays and means for terminating the exposure, means for uniformly varying the intensity of the light rays falling on said layer and a radiation responsive element for actuating the exposure terminating means when the intensity of the light rays falling on said layer reaches a predetermined value.

13. Photographic apparatus comprising means for supporting a sensitized layer in position to be exposed to light and means for terminating the exposure, a light sensitive element responsive to a known proportion of the exposure light, means for uniformly varying the response of said element and means for actuating said exposure terminating means when the response of said element reaches a predetermined value.

14. The method of printing from a photographic record which comprises exposing the record and a sensitized layer to a printing light of known intensity, uniformly varying the intensity of the printing light and terminating the exposure when the light transmitted by said record reaches a predetermined intensity.

15. The method of controlling the exposure period in photographic apparatus which comprises simultaneously starting the exposure of a sensitized layer and energizing a light responsive element proportionately to the intensity of the exposure light, uniformly varying the intensity of light falling on said element and discontinuing the exposure when the response of said element reaches a predetermined value.

16. The method of controlling the exposure of a sensitized layer which comprises simultaneously exposing the layer to light and causing to flow in an electrical circuit a current corresponding to the intensity of the exposure light, uniformly varying the current in the circuit and terminating the exposure when said current reaches a predetermined value.

17. In the art of photographic printing the method of controlling the exposure in accordance with the average density of a record being printed which comprises initiating the exposure at a predetermined low intensity, increasing at a known rate the intensity of the exposing light and discontinuing the exposure when the intensity of the light transmitted by the record reaches a predetermined value.

CLIFTON M. TUTTLE.
HERBERT E. WHITE.
JOHN W. McFARLANE.